United States Patent [19]  [11] 4,343,399
Patel et al.  [45] Aug. 10, 1982

[54] TWO COMPONENT DEVICE FOR USE IN ANCHOR BOLTING AND METHOD OF ANCHORING

[75] Inventors: Natvarlal K. Patel, Warrensville Heights; Anthony C. Plaisted, North Royalton, both of Ohio

[73] Assignee: Celtite, Inc., Georgetown, Ky.

[21] Appl. No.: 254,004

[22] Filed: Apr. 13, 1981

[51] Int. Cl.³ ............................................. B65D 25/08
[52] U.S. Cl. .................................... 206/222; 405/259
[58] Field of Search ................. 206/219, 222; 405/259

[56] References Cited

U.S. PATENT DOCUMENTS

| 2,753,868 | 7/1956 | Seeman | 206/219 |
| 3,306,563 | 2/1967 | Soto | 206/219 |
| 3,655,035 | 4/1972 | Muhlbauer | 206/219 |
| 4,253,566 | 3/1981 | Seeman | 206/222 |

FOREIGN PATENT DOCUMENTS

| 1545963 | 10/1968 | France | 206/222 |
| 2294937 | 8/1976 | France | 206/222 |

Primary Examiner—Joseph Man-Fu Moy
Attorney, Agent, or Firm—Caesar, Rivise, Bernstein & Cohen, Ltd.

[57] ABSTRACT

A cartridge assembly for the securement of anchor bolts in bore holes. The assembly comprises a cartridge having one component of a self-setting mix in a thin plastic casing, a chamber secured to the cartridge and having a sidewall with plural openings, and mechanical perforating means interposed between the cartridge and chamber. The second component of the mix is located within the chamber. The perforating means is arranged to mechanically rupture the cartridge and cause its contents to be carried to the chamber so that the two components intermix thoroughly and extrude through the chamber sidewall openings into the bore hole.

11 Claims, 6 Drawing Figures

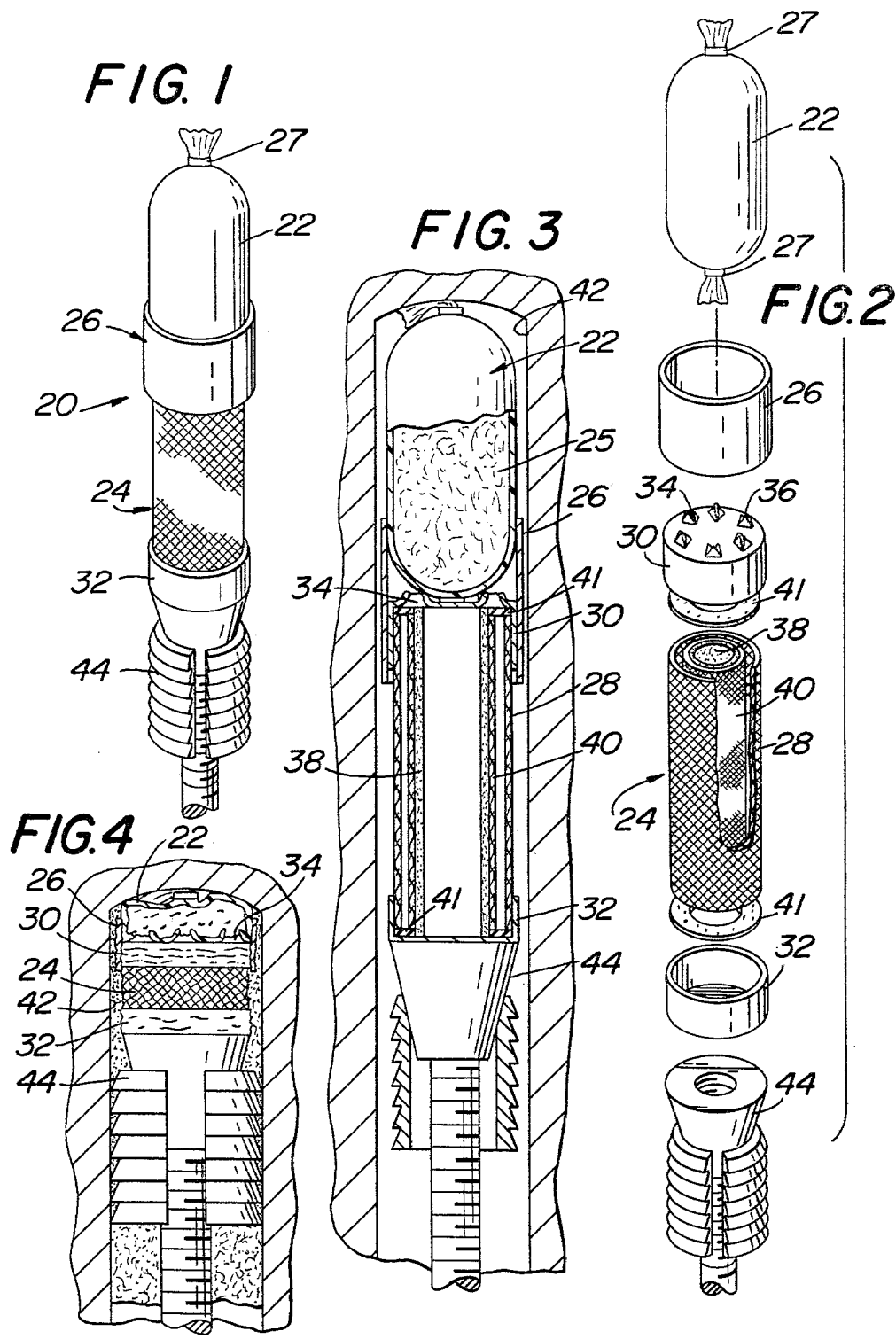

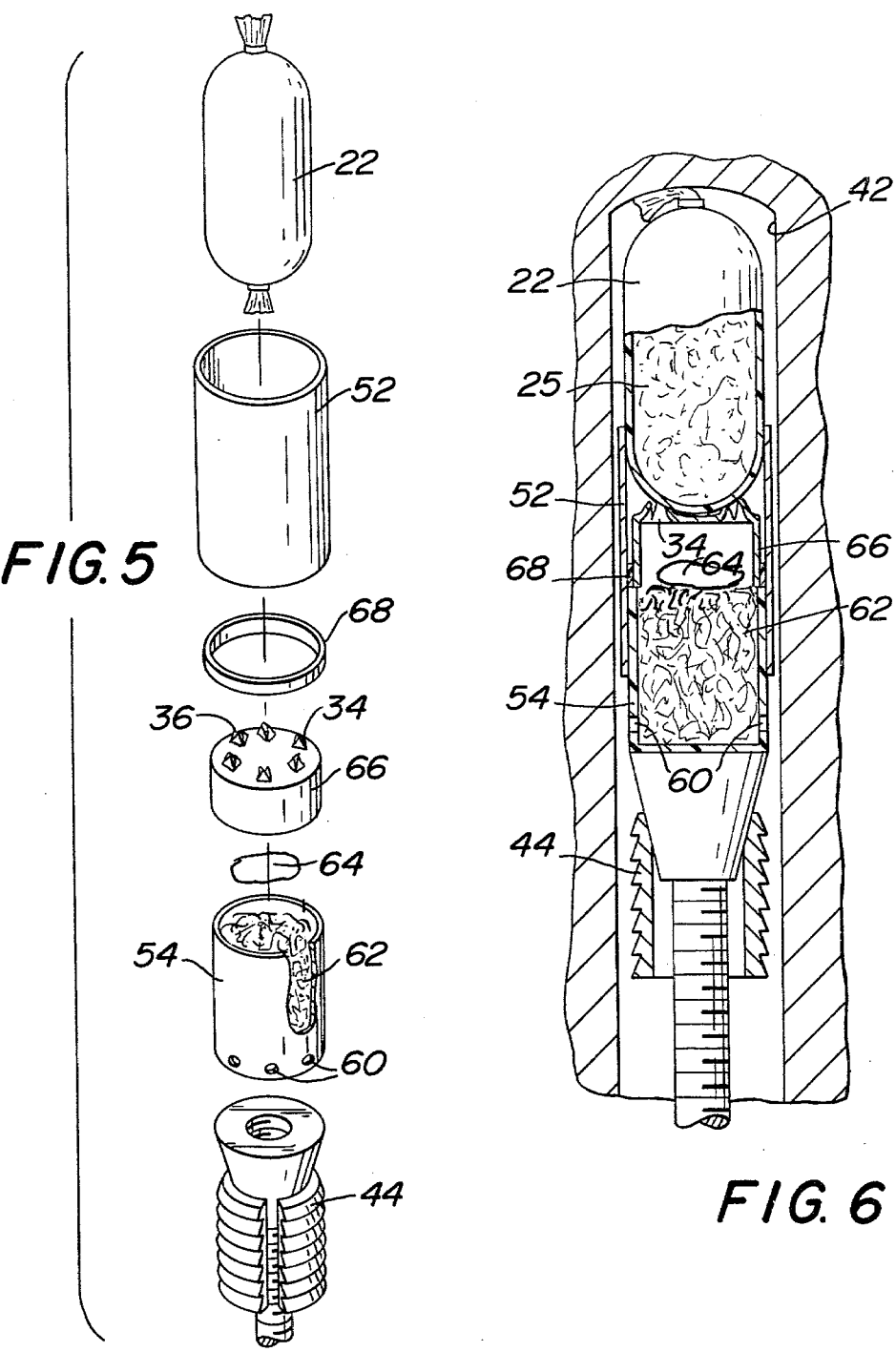

TWO COMPONENT DEVICE FOR USE IN ANCHOR BOLTING AND METHOD OF ANCHORING

This invention relates to a method and means for installing anchor bolts.

Roof bolts have been the accepted as primary roof support in coal and metal mines for over thirty years. It has been customary to use in the installation of roof bolts a mechanical anchor to be located at the bottom end of the hole, the mechanical anchor may comprise an expansion shell, and a bearing plate set between the bolt head and roofline, with the bearing plate serving as the other anchor. The outer surface of the expansion shell is serrated in various shapes to provide a grip against the wall of the hole. Within the shell lies a tapered hollow plug threaded on the inside. This plug is threaded onto a bolt. During installation the plug is pulled down as the bolt is rotated forcing the shell to expand against the wall of the hole. Further rotation places the anchor under tension. Typically a bolt is installed to a torque of 150 foot-pounds. Performance of the bolt and safety of the mine roof depends to a high degree on the condition of the rock at the point of anchorage.

Mechanical anchors installed as set forth in the preceeding paragraph, perform well in hard competent rock where they are able to maintain a large rock contact area. However, in many shales, anchorage soon deteriorates due to the low compressive strength, or the stratified and friable nature of such shales and mudstones. Exposure to humidity and air will also accelerate deterioration leading to anchorage failure. Furthermore, mechanical anchors are subject to corrosion by infiltration of acid mine water.

Several methods are suggested to overcome these problems using cement or resinous grouts, the object being to enlarge the area of contact with the soft rock and so increase anchorage capacity and to offer protection from chemical deterioration. Such methods are described in British Pat. Nos. 734,658, and 1448.760, French Patent application No. 2184041, and OLS No. 2005161. These methods variously employ means for transporting the grout to the point of anchorage. Where necessary mixing techniques are utilized to cause the grout to harden by chemical reaction. Where the grout is carried in cartridge form, rotation of the bolt is necessary in order to rupture the cartridge and cause mixing of the components. Furthermore, debris derived from packaging or mixing chamber (as in OLS No. 2005161) tends to reduce anchorage contact with the wall of the hole, leading to anchorage failure.

We are aware of recently issued U.S. Pat. No. 4,253,566. The device of U.S. Pat. No. 4,253,566 does not provide for any specific means to open or penetrate the mastic sack and the discharge of the mixed components is axial, such that the mixed components may not be properly distributed about the fixing element.

Accordingly, it is a general object of the present invention to overcome these drawbacks and to provide an improved method of anchoring mechanical bolts into less than competent rock.

According to the present invention, there is provided a two stage device for use in anchoring a reinforcing or fixing element, such as a mechanical bolt, in a substrate by means of a self setting grouting composition formed from a polymerizable resin mastic component capable of reacting with a catalyst component so as to cause it to set to a hard mass. The device comprises a flexible cartridge containing the polymerizable resin mastic component in a first compartment and the reactive catalyst component in a second compartment. When required, the resin component can be caused to be released from its compartment and to be transferred to the second compartment containing a catalyst, from which the resin-catalyst mix is radially discharged to be located about the fixing element.

As a means of communication between the two compartments of the device, there is provided a passageway in mechanical perforated means, defined by holes having adjacent sharp projections or prongs oriented toward the flexible cartridge compartment containing the resin component. There is also provided a collar between the two compartments which serves to connect the two self contained compartments and to restrain the resin compartment from being ruptured by the prongs prior to use.

In a first preferred embodiment of the invention, the second compartment comprises a collapsible plastic or preferably a malleable metal mesh in tubular form and round cross section, securely held between upper and lower metal or plastic caps at both ends. The reactive component or catalyst for the mastic is in the form of a layer of paste disposed over the interior surface of the mesh tube. This orientation allows maximum surface area exposure between the two components. The upper cap includes holes with adjacent sharp projections capable of puncturing the upper flexible cartridge compartment.

Upon subjecting the device to axial pressure, for example, when rammed to the back of a bore hole using a mechanical anchor bolt thrust against the lower cap of the mixing chamber, the sharp projections of the mixing chamber mechanically rupture the cartridge initially causing the resin mastic to be substantially conducted into the second compartment, via the holes in the upper cap, where it comes in contact with the catalyst paste. Sustained compressive thrust results in complete collapse of the resin cartridge and total transfer of the resin mastic into the second compartment, accompanied by coincidental extrusion of the reactive components radially through the fine mesh openings of the chamber wall. By employing increased compressive thrust, progressive collapse of the mixing chamber results, expelling all mastic grout from within the chamber into the bore hole and encasing the anchor. All other material constituting the anchor device is thrust to the back of the bore hole and compressed into small volume and does not interfere in any way with the bolt anchorage.

In another preferred embodiment of the device the mixing chamber comprises a plastic tube having a cylindrical sidewall and a bottom wall. Plural openings are disposed about the periphery of the sidewall adjacent the bottom wall. Wire or plastic mesh is disposed within the tube. A cap is disposed over the upper or open end of the tube and includes plural holes having sharp projections capable of puncturing the upper flexible cartridge component. That component is held in place over the cap by a plastic collar. A plastic sealing ring is located within the collar and about the cap to ensure that a tight leak-proof fit results. The reactive component or catalyst is located as a mass within the plastic tube between the metal cap and the wire or plastic mesh.

Upon subjecting the device to pressure by the force of the anchor bolt, as described heretofore with reference to the first embodiment, the sharp projections mechanically rupture the cartridge causing the resin mastic to flow into the mixing chamber, via the perforations in the cap, where it mixes with the catalyst mass. Sustained compressive thrust causes the complete collapse of the cartridge casing and the total transfer of the resin mastic into the mixing chamber. The wire or plastic mesh within the tube causes turbulent flow and concomitant intimate mixing of the reactive components. The mixed components exit radially through the openings in the tube sidewall.

These various stages in cartridge puncture, resin transfer, mixing, extruding, and collapsing of the assembly are performed with rapidity, and furthermore, are executed without rotation of the reinforcing or fixing element to effect mixing of the reactive components.

The cartridge assembly of the invention can utilize various combinations of self-settable compositions either solid/liquid or liquid/liquid components. Such compositions may be based on epoxy, polyurethane, unsaturated polyester, phenol-formaldehyde, urea-formaldehyde, or melamine-formaldehyde resins. Such organic systems will normally contain inorganic fillers for example limestone, talc, silica or clays, etc. The foregoing are exemplary only and are not to have a limiting effect upon the invention.

Reference is now made to the following figures of the drawings wherein:

FIG. 1 is a three-dimensional view of a first preferred embodiment of the device of this invention;

FIG. 2 is an exploded three-dimensional view of the anchoring cartridge of FIG. 1;

FIG. 3 is an enlarged sectional view of the anchoring cartridge of FIG. 1 shown located within a bore hole;

FIG. 4 is a view similar to FIG. 3, but wherein the anchoring cartridge has been activated;

FIG. 5 is a view similar to FIG. 2 but showing a second preferred embodiment of the device of the instant invention; and FIG. 6 is a view similar to FIG. 3 but showing said second preferred embodiment.

Referring now to the drawing wherein like reference numerals refer to like parts, there is shown at 20 in FIG. 1, one preferred embodiment of the device of the instant invention. The device 20 basically comprises a self contained cartridge 22, chamber 24 and a connecting collar 26. The device 20 (as will be seen hereinafter) is activated by an anchor bolt or other object that is to be fixed in a hole.

The cartridge 22 is a flexible casing formed from a sleeve of flexible, tubular, synthetic film 23 (FIG. 3), such as Mylar, polyester or laminated with polyethylene and is filled with a resin mastic polymerizable component 25 capable of reacting with a catalyst component. The mastic comprises a polyester or epoxy, or other reactive composition having long shelf-life. The cartridge is sealed at both ends by a respective clip 27, or other conventional sealing means, e.g., a heat seal. The cartridge 22 is attached to the chamber 24 by means of the collar 26. In the embodiment of the invention shown in FIG. 1, the collar is in the form of a rigid plastic sleeve.

The first chamber 24 is arranged to enable the mastic to come into maximum mixing contact with the catalyst in the axially aligned second chamber. The second chamber can take various forms as shown in the alternative embodiments shown herein. In one preferred embodiment, which is shown in FIG. 1, the second chamber comprises an outer sleeve or tube 28 formed of a deformable metal or plastic mesh of similar diameter to the cartridge. Preferably the mesh size should be from 4×4 to 10×10 radially oriented openings per linear inch. The length of the chamber is such that the total volume of the chamber is not more than 100% of the volume of the cartridge.

The tubular mesh sleeve 28 of the mixing chamber is held between two metal or rigid plastic caps 30 and 32 (FIG. 3). The upper cap 30 on rupturing means is perforated with plural holes 34, each having sharp, pointed projections 36 which define the periphery of the hole. The projections 36 project upward and are arranged to pierce the mastic cartridge axially toward the mastic cartridge, as will be described later. Generally six such openings 36 are located circumferentially about the cap 30 as shown in the view of FIG. 2. The lower cap 32 is unapertured to completely seal the bottom of the chamber.

The second or catalyst component necessary for hardening or polymerization with the mastic component is, in the embodiment of FIG. 1, located in the chamber.

It must be pointed out at this juncture that while the catalyst is shown located within the chamber, such an arrangement is not exclusive. Thus, the catalyst can be located outside of the chamber provided that it is carried into the chamber for intermixing with the mastic component also carried therein.

In the embodiment of FIG. 1, the catalyst is in the form of a paste which is distributed in a layer 38 (FIG. 3) evenly over the inside surface of a second, inner tube or sleeve 40. The second sleeve is formed of a plastic coated wire mesh having mesh size preferably not less than 16×16 openings per inch. The second sleeve 40 is located coaxially within the first sleeve, as shown in FIG. 3.

The top cap 30 is secured to the upper end of the mesh sleeves 28 and 49 forming the chamber by use of a hot melt adhesive seal 41 or a compressible gasket. The bottom cap 32 is secured in a similar manner to the lower end of sleeves 28 and 40. The seals 41 prevent leakage of material from the chamber and insure pressure build up therein prior to extrusion of the mixed material into the bore hole.

The device 20 is placed in a bore hole 42 (FIG. 3) with cartridge 22 disposed innermost (in the embodiment shown in FIG. 3-uppermost). The assembly is pushed to the back of the hole by the use of the anchor bolt or fixing device 44. The inward thrust of the anchor bolt 44 causes the sharp projections 36 of the cap 30 to pierce or rupture the cartridge casing 23, whereupon the mastic 25 flows through the plural holes 34 into the interior of the inner sleeve 40 of the chamber 24. Sustained compressive thrust on the anchor causes the complete collapse of the cartridge casing 23 and the total transfer of the mastic into the interior of the inner sleeve of the chamber 24. As the mastic extrudes radially through the reactive component 38 and out through the mesh openings in the sleeves, the components are intimately mixed and expelled radially in the annulus between the wall of the bore hole and the anchor. Further inward pressure by the fixing element ultimately causes sleeve 40 to collapse, but preferably not until mastic 25 has been ejected By employing increased compressive thrust on the anchor, progressive collapse of the mixing chamber results, as shown in FIG. 4, whereupon all of the mixed mastic grout is expelled from within the mixing chamber into the bore hole 42, thereby encasing the anchor. The collapsed assembly 20 takes up only a small volume of the bore hole, e.g., 10%, at the back of the bore hole, and thus, does not in anyway interfere with the bolt anchorage.

In FIGS. 5 and 6 there is shown a second preferred embodiment of the device of the instant invention identified as 20A. In that embodiment the cartridge 22 in a first chamber is a flexible casing formed from a sleeve of flexible, tubular, synthetic film 23, such as Mylar, polyester or laminated with polyethylene and is filled with a polymerizable resin mastic component 25 capable of reacting with a catalyst component. The mastic comprises a polyester or epoxy, or other cementitious composition having long shelf-life. The cartridge is sealed at both ends by a respective clip 27, or other conventional sealing means, e.g., a heat seal. The cartridge 22 is attached to the second chamber 50 by means of the collar 52 in the form of a plastic sleeve.

The second chamber 50 comprises a tube 54 formed of a plastic of similar diameter to the cartridge. The tube includes a circular sidewall 56 and a flat bottom wall 58. Plural radially oriented openings 60 are disposed in the sidewall about the periphery thereof immediately adjacent the bottom wall 58. A compressible mass, such as a wire or plastic, mes 62 is disposed within the tube 54. A mass of a catalyst paste 64 contained in a capsule is located on top of the mesh mass 62.

A metal or rigid plastic cap 66 is disposed on the upper or open end of the tube. The cap 66 is constructed in a similar manner to cap 30 and hence includes plural holes 34, each having adjacent sharp, pointed projections 36 which define the periphery of said hole.

A plastic sealing ring 68 is interposed between the periphery of the cap 66 and the interior of collar 52 to ensure that there is a tight leak-proof fit between the cap and the collar.

The device of FIG. 5 is placed in a bore hole 42 with the cartridge 22 disposed innermost (in the embodiment shown in FIG. 6-uppermost). The assembly is pushed to the back of the hole by the use of the anchor bolt or fixing device 44. The inward thrust of the anchor bolt 44 causes the sharp projections 36 of the mixing cap 66 on rupturing means to pierce or rupture the cartridge casing 23, whereupon the mastic 25 flows through the plural holes 34 into the interior of the tube 54 of the chamber. The mastic thus contacts the mass of catalyst paste 64 for interaction therewith. Sustained compressive thrust on the anchor causes the complete collapse of the cartridge casing 23 and the total transfer of the mastic into the interior of the chamber. The compressive force applied to the mastic and resin causes turbulent flow of the mastic and resin throughout the plastic mesh to result in a thoroughly mixed grout. The resulting mixture extrudes radially out through the openings 60 in the sidewall of the chamber and into the annulus between the wall of the borehole and the anchor.

It is contemplated that collar 52 and tube 54 be combined into a single tube with ring 68 being eliminated. The cap 66 would be held snugly within the combined tube.

By employing increased compressive thrust on the anchor, progressive collapse of the chamber results as described heretofore, whereupon all of the mixed mastic grout is expelled from within the chamber into the bore hole 42, thereby encasing the anchor. The collapsed assembly takes up only a small volume of the bore hole, e.g., 10% at the back of the bore hole, and thus, does not in anyway interfere with the bolt anchorage.

The plastic collars 26 and 52 of the embodiments of FIGS. 1 and 5, respectively each perform two important functions, namely, each acts as a spacer between the cartridge and the chamber by restraining the device and holding it firmly over the rupture device (the cap) of the chamber, and each acts as a guide for the collapsing cartridge casing as the first component is conducted into the chamber. This latter feature ensures complete transfer of the cartridge contents by preventing misalignment and possible rupture of the casing.

Another important aspect of this invention is the direction of flow of the grout laterally out of the chamber. It has been found preferable to effect at least a substantial portion of the flow radially out of the chamber in order to ensure unimpeded exit for the mixed components. In this way, the self settable composition is directed towards the sides of the bore hole in the region of the anchorage location, thus providing for maximum bond contact between bore hole wall and the mechanical anchor. It has been observed that with the expulsion of the mixed components parallel with the anchor device, inward velocity of the anchor device tends to force the self-settable composition past the anchor zone towards the mouth of the bore hole where it serves no purpose.

While the chambers 24 and 50, shown and described herein, represent preferred embodiments of the invention, other chambers can be constructed in accordance with the teachings hereof. For example, in a variation of the first preferred embodiment, the reactive second component or catalyst can be distributed evenly over the inside surface of a second tubular plastic or metal mesh screen placed inside the outer screen, but within close proximity of it and a flexible plastic membrane, such as polyvinyl acetate, polyvinyl chloride, or polyvinyl acrylate, can be used to cover the inner mesh screen. The advantages of such a coating include containment of the second component in an airtight compartment, thereby preventing the second component from drying out during storage, and provision of a continuous surface of even distribution of the second component over the inner surface of the mesh screen, thereby exposing the maximum surface area for the two components to interact. This allows substantially full transfer of the first component into the chamber, and some pressure build-up to occur before bursting out by rupture through the openings of the mesh screen by rupture of the flexible plastic membrane. Where wire mesh is the preferred screen, the plastic membrane provides corrosion protection from such materials that might constitute the second component.

In another embodiment of the invention, the mixing chamber may comprise a spiral of woven wire or plastic mesh formed into a cylinder housed within the outer wire mesh of the chamber, with the second component (in the form of a paste) being coated over all the inside wall of the wire or plastic cylinder. Passage of the two components radially through the multiple layers of woven fabric effectively mixes the two components before being expelled through the outer deformable wire mesh sidewalls of the chamber. In such a configuration, it is preferred to coat the outer wire mesh with a flexible plastic coating capable of bursting to expel the self setting composition.

In yet another embodiment of the invention, the mixing chamber may comprise an outer deformable wire or plastic mesh having an inner cylinder of thin walled rigid plastic filled with compressible plastic fiber or wire wool. A crosscut conical plastic cap is inserted into its upper end and contains the reactive second component. Upon entrance of the first component, the plastic cap opens at the crosscut, releasing the second component together with the first component into the plastic cylinder. Mixing of the components takes place along the length of the cylinder within the wire of plastic woven mesh. Saw-tooth openings in the base of the plastic cylinder allow exit for the self-settable mixture and subsequent exit laterally through the outer wire mesh cage.

In a still another embodiment of the invention, the chamber may comprise an outer deformable plastic or wire mesh, together with a plastic coated inner wire or plastic mesh cylindrical form containing compressible fibers of plastic or wire precoated with the second component. Introduction of the first component into the chamber, via the perforated cap, causes it to percolate through the fibrous mass, blending en route with the second component before the mixture is expelled laterally through the inner mesh wall and subsequent outer wire or plastic mesh wall of the chamber.

In a further embodiment of the invention, the chamber may comprise an outer deformable wire or plastic mesh and an inner thin walled rigid plastic or metal cylinder. Within the cylinder is placed a section of an in-line mixing device. An example of such a device is sold under the trademark STATATUBE by T. A. H. Industries, Inc. Such a device comprises rigid plastic segments geometrically oriented so as to cause maximum interference with flow through the chamber. The second component in paste form is placed in a crosscut plastic cup secured in the upper end of a rigid plastic or metal cylinder. Entrance of the first component into the chamber under pressure forces open the crosscut plastic cup sweeping the second component into the cylinder and through the static member. Exit is provided at the bottom of the cylinder, via saw-toothed openings, before final extrusion laterally through the outer mesh of the chamber.

In yet another embodiment of the invention, a rubber bung or cork is placed adjacent one end of the mastic sack. The bung or cork tapers toward the sack and a steel ring or washer is positioned on the tapered bung or cork. Catalyst paste is introduced below the ring or washer. Downward pressure causes the bung or cork to be displaced away from the metal ring or washer as the contents of the sack are forced into contact with the catalyst and then the mixture is discharged radially through openings in a tube which holds the catalyst and the bung-ring assembly as well as at least the lower part of the resin sack.

Another aspect of the invention involves the placing of the mastic in a first chamber. The second chamber also holds the catalyst which may be present in a capsule form or in power form. This provides a two compartmented chamber where there can be communication between the two chambers at the time of use and expulsion of the components radially with the application of the inward force of an anchor bolt.

Also, both devices 20 of FIG. 1 and 20A of FIG. 6 can be enclosed in an outer wrapping or sleeve which is preferably a heat shrinkable material so that the sleeve clings closely to the device. In the case of device 20 of FIG. 1, the sleeve will have appropriate openings which generally communicate with the openings in the mesh tube 28.

The invention is further illustrated by way of the following non-limiting Examples:

EXAMPLE 1

A cartridge assembly as shown in FIG. 1 consisted of a 32 mm diameter tube of polyester laminate film as casing 3½ inches long and filled with 125 g of polyester mastic of composition:

|  | Weight Percent |
|---|---|
| Moderately Promoted Unsaturated Polyester | 40.0 |
| Fumed Silica | 0.3 |
| Limestone Filler | 59.7 |
|  | 100.0 |

The catalyst for the foregoing mastic is a benzoyl peroxide paste having the following composition:

|  | Weight Percent |
|---|---|
| 25% Benzoyl Peroxide in Butyl Benzyl Phthalate | 60.0 |
| n-Butyl Phthalate | 10.0 |
| Titanium Dioxide | 30.0 |
|  | 100.0 |

The cartridge was sealed by clipping at both ends and attached to a mixing chamber of diameter 32 mm and 89 mm long, containing 12.5 g of Benzoyl Peroxide paste (20% B.P.O.) evenly spread over the inside surface of the plastic coated inner wire mesh tube. The cartridge assembly was inserted into a 1⅜ inch diameter clear plastic tube closed at one end with a plastic cap. A ⅝ inch diameter bail type mechanical anchor was inserted behind the mixing chamber and the whole assembly placed upright between the platens of a Warner and Swasey testing machine.

Force was applied to the bolt in an upward direction such that the bolt moved into the cartridge assembly at a rate of one foot (30.5 cm)) per minute. The following observations were made.

Puncturing of cartridge took place at 50 pounds thrust.

Extrusion of mastic into lower chamber occurred at 60 pounds thrust.

Bursting of mastic/paste mixture through wire mesh screen took place between 60 pounds and 500 pounds thrust.

Crushing of cartridge occurred between 500 and 1500 pounds thrust.

Final length of crushed assembly was under one inch (2.54 cm).

No interference from crushed debris occurred at the anchorage zone. The extruded mastic solidified within 90 seconds and was all confined in the anchorage zone.

EXAMPLE 2

A total of ten 32 mm cartridge assemblies were prepared containing mastic composition similar to Example 1, and tested underground in a coal mine using the following procedure.

A 1⅜ (34.9 mm) diameter drill steel was measured and marked one inch longer than the mechanical bolt length. Total length of the hole was 46 inches (116.8 mm). A cartridge assembly was inserted into the hole followed by a ⅝ inch (15.9 mm) mechanical bolt. With the head of the bolt engaged in a chuck, the bolt and cartridge were lifted to the back of the hole. The bolt was then torqued to 150 foot-pounds. The installation was completed within 30 seconds. After all ten bolts were installed, the torque was remeasured on each bolt and was found to vary between 145 and 160 foot-pounds. After one hour, one bolt was tensioned to 9 tons using a hydraulic jack at which point the bolt stretched and broke.

Inspection of the remaining bolts was made after four weeks. All of the resin bonded bolts retained their installed torque values indicating no slippage of the anchor.

Although demonstrated as an aid in upgrading mechanical bolt anchorages, the invention is not limited to this application.

Other type of reinforcing elements may be conveniently installed using this cartridge assembly without the need of spinning the anchor. For instance, conventional deformed bar, or rebar, may be used, glass fiber rod or wooden dowel. In summary, any rod capable of transmitting a thrust of 1500 pounds may be anchored using this device.

Without further elaboration the foregoing with so fully illustrate our invention that others may, by applying current or further knowledge, readily adapt the same for use under various conditions of service.

What is claimed as the invention is:

1. A device for securing a bolt in a bore hole, said device being adapted to be positioned in said hole and comprising first and second axially aligned chambers, said first chamber containing a first flowable component of a multicomponent self-setting mix, said device further comprising a second chamber having radially oriented discharge openings, said second chamber being provided with a second component of said mix, and rupturing means to induce flow of said first component into said second chamber whereby upon application of further inwardly directed axial force, said first and second components are urged radially of said second chamber through said discharge openings and outwardly of said second chamber toward said hole.

2. The cartridge assembly of claim 1 wherein said means comprises a cap having at least one hole therein and plural pointed projections extending upward about said hole.

3. The device of claim 2 wherein said second chamber comprises a pair of concentrically spaced mesh sleeves forming said sidewall.

4. The device of claim 3 wherein said one component is disposed as a layer of paste on the interior of the innermost of the concentric sleeves.

5. The device of claim 4 wherein said connection means comprises a collar.

6. The device of claim 5 wherein said collar is formed of a plastic sleeve.

7. The device of claim 1 wherein said second chamber comprises a tube having a circular sidewall and a bottom wall, said sidewall including said plural opening immediately adjacent said bottom wall.

8. The device of claim 7 wherein said mechanical perforating means comprises a cap having at least one hole therein and plural pointed projections extending upward about said hole.

9. The device of claim 5 wherein said tube includes a mass of woven mesh material having openings, to create turbulent flow within said chamber.

10. The device of claim 9 wherein said one component comprises a mass of paste located under said cap and above said mass of strands.

11. A method of anchoring a bolt into a surface, comprising drilling a bore hole of adequate diameter and depth into said surface, inserting into said bore hole a device comprising first and second axially aligned chambers, said first chamber containing a first flowable component of a multicomponent self-setting mix, said device further comprising a second chamber having radially oriented discharge openings, said second chamber containing a second component of said self-setting mix, and rupturing means to induce flow of said first component into said second chamber, introducing the bolt to be anchored to contact said device and by a ramming action to take the device to the back of the hole and cause the device to be ruptured and subsequent collapse of the device whereby as said ramming action proceeds, said first flowable component is caused to flow into second chamber and then to be discharged radially of said second chamber through said discharge openings and outwardly of said second chamber toward said hole.

* * * * *